United States Patent [19]

Lang et al.

[11] 4,090,159

[45] May 16, 1978

[54] CIRCUIT BREAKER WITH IMPROVED TRIP MEANS

[75] Inventors: Walter W. Lang; Alfred E. Maier, both of Beaver Falls, Pa.

[73] Assignee: Westinghouse Electric Corp., Pittsburgh, Pa.

[21] Appl. No.: 605,372

[22] Filed: Aug. 15, 1975

[51] Int. Cl.[2] ........................ H01H 73/02; H02H 1/00

[52] U.S. Cl. ........................................ 335/173; 335/35; 361/87

[58] Field of Search .......................... 335/173, 167, 35; 317/58

[56] References Cited

U.S. PATENT DOCUMENTS

| | | | |
|---|---|---|---|
| 3,116,388 | 12/1963 | Hobson, Jr. | 335/173 |
| 3,256,407 | 6/1966 | Klein | 335/173 |
| 3,789,268 | 1/1974 | Klein | 317/58 |
| 3,808,567 | 4/1974 | Maier | 335/167 |

*Primary Examiner*—Harold Broome
*Attorney, Agent, or Firm*—M. J. Moran

[57] ABSTRACT

A circuit breaker comprises a stored-energy mechanism and a resettable roller-type latch for latching the stored-energy mechanism. The latch is operable upon the occurrence of overload current conditions to release the stored-energy mechanism to thereby trip the breaker. Alternately the latch may be actuated by utilizing a separate switch.

7 Claims, 4 Drawing Figures

CIRCUIT BREAKER WITH IMPROVED TRIP MEANS

BACKGROUND OF THE INVENTION

1. Field of the Invention

Circuit breakers, and more particularly circuit breakers of the type comprising a latched stored-energy mechanism releasable to effect tripping operations.

2. Description of the Prior Art

A circuit breaker having an operating mechanism of the type herein disclosed is disclosed in U.S. Pat. No. 3,808,567 issued Apr. 30, 1974 to A. E. Maier and assigned to the assignee of the present invention. The latter circuit breaker has a single coil for utilization with a magnetic stored-energy device. It has no provision for being electrically opened manually, i.e., in a non-fault current or non-overload situation as contrasted to being mechanically opened manually. Circuit breakers which have provision for being electrically manually opened usually require a second coil for accomplishing that purpose. It would be advantageous if a circuit breaker opening mechanism could be found which was operable automatically on a sensed fault current or which was operable manually (non-automatically) by pushbutton, relay or similar means. Other patents of interest are U.S. Pat. No. 2,794,881 issued June 4, 1957 to E. J. Frank and U.S. Pat. No. 3,460,075 issued Aug. 5, 1969 to N. Yorgin et al.

SUMMARY OF THE INVENTION

The present invention is an improvement of aforementioned U.S. Pat. No. 3,808,567.

A circuit breaker comprises a pair of contacts and a stored-energy mechanism releasable to trip open the contacts. A roller-type latch means is provided for latching the stored-energy mechanism. The latch means comprises a first latch member supported for pivotal movement about one end thereof and carrying a first roller means in proximity to the other end thereof. The first roller means engages a releasable member of the stored-energy mechanism to latch the stored-energy mechanism. The latch means comprises a second pivotally supported latch member. A second roller means is provided between the second and first latch members in proximity to said other end of the first latch member to provide a latching engagement between the second and first latch members. The first and second roller means on the first and second latch members enables a force reduction through the latch structure with reduced friction. A third latch member is provided for latching the second latch member, and means is operable to move the third latch member either automatically or upon given command to an unlatching position to thereby release the first and second latch members to thereby release the releasable member whereupon the stored-energy mechanism is automatically operated to the tripped open position. The third latch member cooperates with an externally accessible manually operable member. An operator can depress the manually operable member to move the third latch member in order to provide a manual tripping operation. The first and second roller means more specifically comprise a first roller supported on and between a pair of opposite legs of the first latch member and a pair of second rollers supported on the first latch member on the outer sides of the opposite legs of the first latch member. The second rollers engage a pair of spaced latch surfaces on a pair of spaced leg portions of the second latch member when the latch structure is in the latched position. The stored-energy of the operating mechanism provides the driving force for moving the releasable member which operates through the roller latches to move the first and second latch members out of the latching position when the third latch member is moved to unlatch the latch structure.

BRIEF DESCRIPTION OF THE DRAWINGS

For a better understanding of the invention reference may be had to the preferred embodiment shown in the accompanying drawing, in which.

DESCRIPTION OF THE PREFERRED EMBODIMENT

Figure 1:
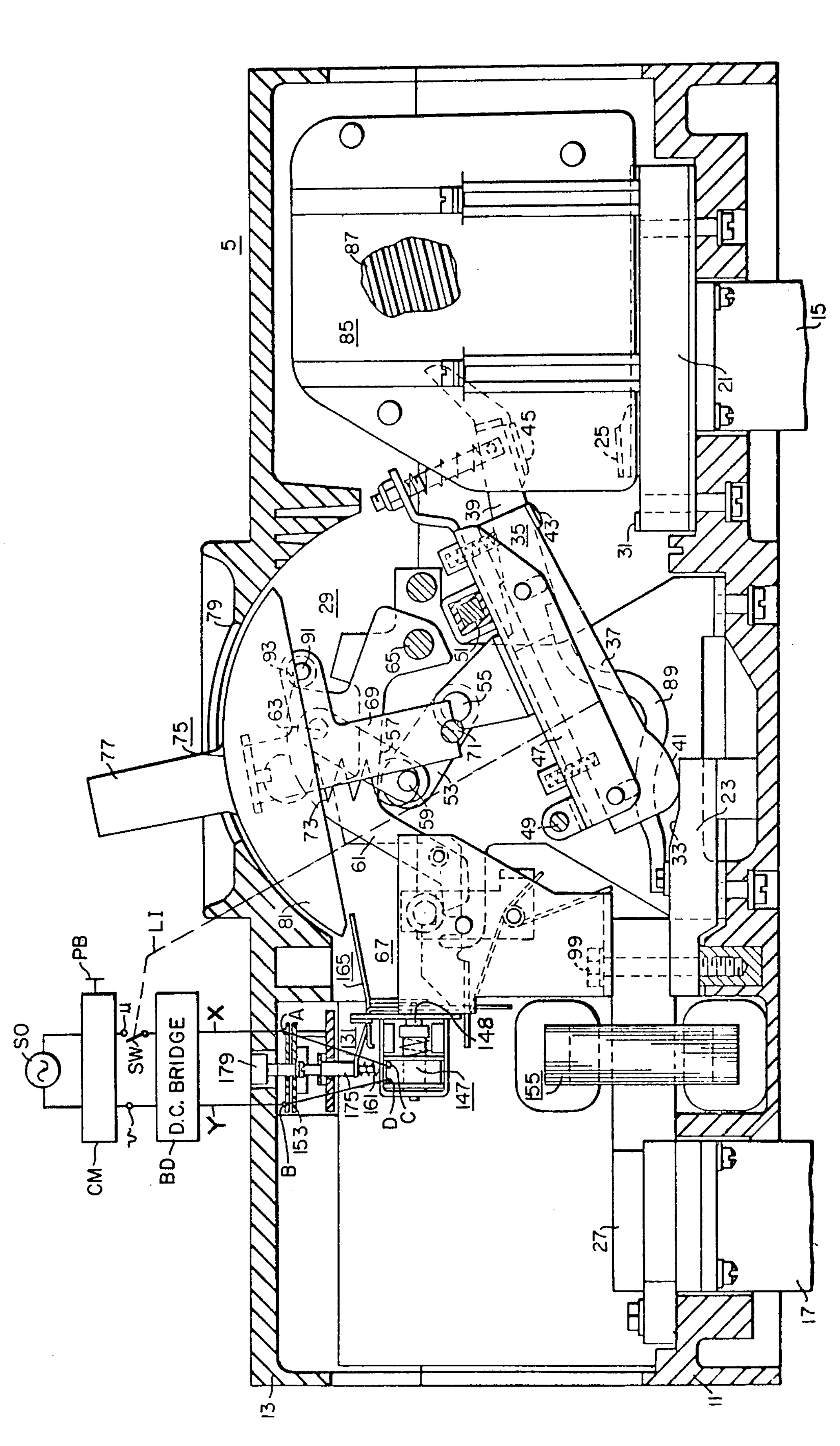
FIG. 1 is a side sectional view, with parts broken away, through the center pole unit of a three-pole circuit breaker.

Referring to the drawing, there is shown the center pole unit of a three-pole molded-case or insulating-housing type circuit breaker 5. The trip means of the circuit breaker 5 is more specifically described in U.S. Pat. No. 3,826,951 issued to A. E. Maier, et al on July 30, 1974. The circuit breaker 5 comprises an insulating housing comprising a molded insulating base 11 and a molded insulated cover 13. Suitable insulating barrier means separates the housing 11, 13 into three adjacent insulating compartments for housing the three pole units of the three-pole circuit breaker in a manner well-known in the art. In each pole unit, two terminals 15 and 17 are provided at openings in the base 11 in proximity to the opposite ends of the housing to enable connection of the circuit breaker in an electric circuit.

In each of the three pole unit compartments of the circuit breaker, there are two spaced conductors 21 and 23 suitably secured to the base 11. The terminal 15 is secured to the flat undersurface of the conductor 21. A stationary contact 25 is fixedly secured to the front of the conductor 21. A rigid main conductor 27 is mounted on the base 11 and connected, at one end thereof, to the conductor 23. The other terminal 17 is connected to the flat undersurface of the conductor 27.

A single stored-energy type operating mechanism 29, for controlling all three pole units, is mounted in the center pole unit compartment of the circuit breaker. In addition to the stationary contact 25, there is a stationary contact 31 mounted on the conductor 21 and a stationary contact surface 33 on the conductor 23 in each pole unit of the circuit breaker. The operating mechanism 29 is operable to move a movable contact structure indicated generally at 35 between open and closed positions. The movable contact structure 35 is of the type more specifically described in a U.S. Patent to Cellerini, U.S. Pat. No. 3,662,134. The movable contact structure 35 comprises a plurality of main bridging contact arms 37 and an arcing contact arm 39. Each of the main bridging contact arms 37 comprises a contact surface 41 cooperable with the stationary contact surface 33 and a contact 43 cooperable with the contact 31, and the arcing contact arm 39 comprises a contact 45 cooperable with the stationary contact 25. The contact structure 35 is supported on a contact carrier 47 that is supported for pivotal movement about a pivot pin 49. A rigid insulating tie bar 51 extends across all three pole units and is connected to the three contact carriers 47 to simultaneously move the three contact carriers 47 between open and closed positions. The contact carrier 47, for the center pole unit, is pivotally connected to a lower toggle link 53 by means of a pivot pin 55. The lower toggle link 53 is pivotally connected to an upper toggle link 56 by means of a knee pivot pin 59. The upper toggle link 57 is pivotally connected to a releasable trip member 61 by means of a pivot pin 63. The releasable trip member 61 is supported at one end thereof for pivotal movement about a fixed pivot pin 65. The releasable trip member 61 is latched, at the other end thereof, by means of a latch structure 67. An inverted generally U-shaped operating lever 69 is supported at the inner ends of the legs thereof for pivotal movement on a pair of fixed pins 71. Tension springs 73 are connected at the lower ends thereof to the knee pivot 59 and at the upper ends thereof to the bight portion of the operating lever 69. A handle structure 75 is connected to the front end of the operating lever 69 and comprises a handle part 77 that extends out through an opening 79 in the front of the cover 13. The handle structure 75 comprises a shroud 81 that substantially closes the opening 79 in all positions of the handle structure 75. In each pole unit, an arc-extinguishing structure 85, comprises a plurality of generally U-shaped magnetic plates 87 supported in a spaced stacked relationship. The arc-extinguishing structure 85 operates to extinguish arcs drawn between the contacts 25, 45 during opening operations in a manner well-known in the art.

In each pole unit, the arcing contact arm 39 is electrically connected to the conductor 23 by means of a flexible conductor 89. In the closed position of the contacts, the circuit, through each pole unit, extends from the terminal 17 through the conductor 27, the conductor 23, the movable contact structure 35, the conductor 21, to the other terminal 15. The main bridging contact arms 37 carry most of the current in the closed position of the contacts, and the current path through these contact arms extend from the contact surfaces 33, through the contacts 41, the bridging contact members 37, the contacts 43, to the contact 31. During opening operations, the main bridging contacts 43, 31 separate first and thereafter, the current is carried from the conductor 23 through the flexible conductor 89, the arcing contact arm 39, the arcing contact 45 and the arcing contact 25. When the arcing contact arm 39 separates an arc is drawn between the contacts 25, 45 and extinguished in the arc-extinguishing structure 85 in a manner well-known in the art.

The circuit breaker is shown in FIG. 1 in the open position with the releasable trip member 61 latched in the latched position shown by means of the latch mechanism 67. In order to close the circuit breaker, the handle 77 is moved in a clockwise direction from the off or open position to the on or closed position to move the operating lever 69 clockwise about the pivot 71. During this movement, the overcenter springs 73 are moved overcenter to erect the toggle 53, 57 to thereby pivot the movable contact structure 35 of a center pole unit in a clockwise direction about the pivot 49 to the closed position. With the three contact carriers 47 being connected for simultaneous movement by means of the tie bar 51, this movement serves to simultaneously move all three of the movable contact structures to the closed position. When it is desired to manually open the circuit breaker, the handle 77 is moved counterclockwise to the off position seen in FIG. 1. This moves the springs 73 overcenter to cause collapse of the toggle 53, 57 to thereby move the contact structures 35 to the open position illustrated in FIG. 1. Each of the contact carriers 47 and movable contact structures 35 moves about the associated pivot pin 49 with all of the contact carriers and movable contact structures moving about a common axis between the open and closed positions.

When the circuit breaker is in the closed position and an overload occurs in any of the three pole-units or a manually initiated electronic command is provided, the releasable member 61 will be released, in a manner to be hereinafter described, to automatically trip the circuit breaker open. Upon release of the releasable member 61, the springs 73, which are in a charged condition, rotate the trip member 61 in a clockwise direction about the pivot 65 to cause collapse of the toggle 53, 57 to thereby move the three contact carriers 47 and movable contact structures 35 to the open position in a manner well-known in the art. Upon tripping movement of the circuit breaker, the handle 77 is moved to an intermediate position in between the "off" and "on" positions to provide a visual indication that the circuit breaker has tripped open.

Following a tripping operation, it is necessary to reset and relatch the circuit breaker mechanism before the contacts can be closed. Resetting and relatching is achieved by moving the handle 77 to a position past the "off" position. During this movement, a pin member 91 on the releasable member 61 engages a shoulder portion 93 on the releasable member 61, and the releasable member 61 is moved down to a position to relatch the latch structure 67 in a manner to be hereinafter described. Following relatching of the latch structure 67, when the operator releases the handle 77 the releasable member 61 will again be reset and relatched in the position seen in FIG. 1. Thereafter, the circuit breaker can be operated in the same manner as was hereinbefore described.

Figure 3:
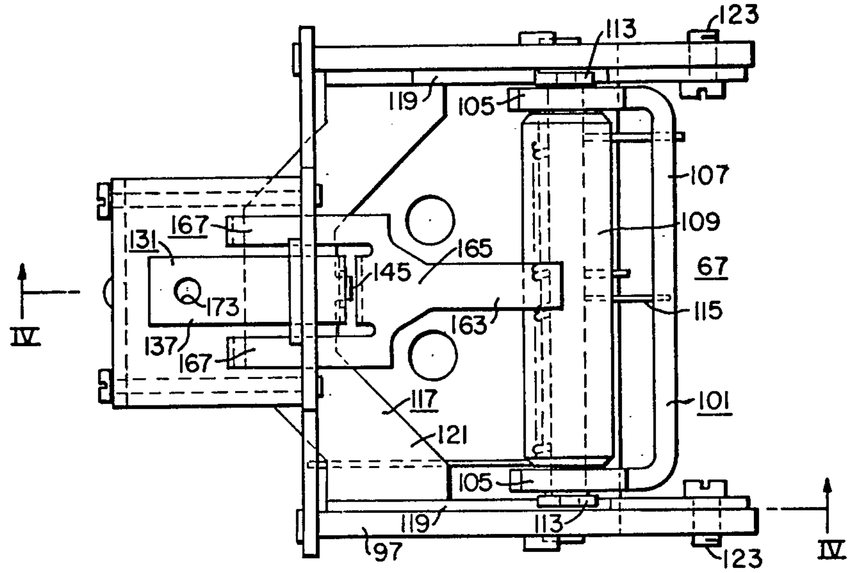
FIG. 3 is a top plan view, with the releasable trip member broken away, of the latch-and-trip means seen in FIG. 2.
Figure 4:
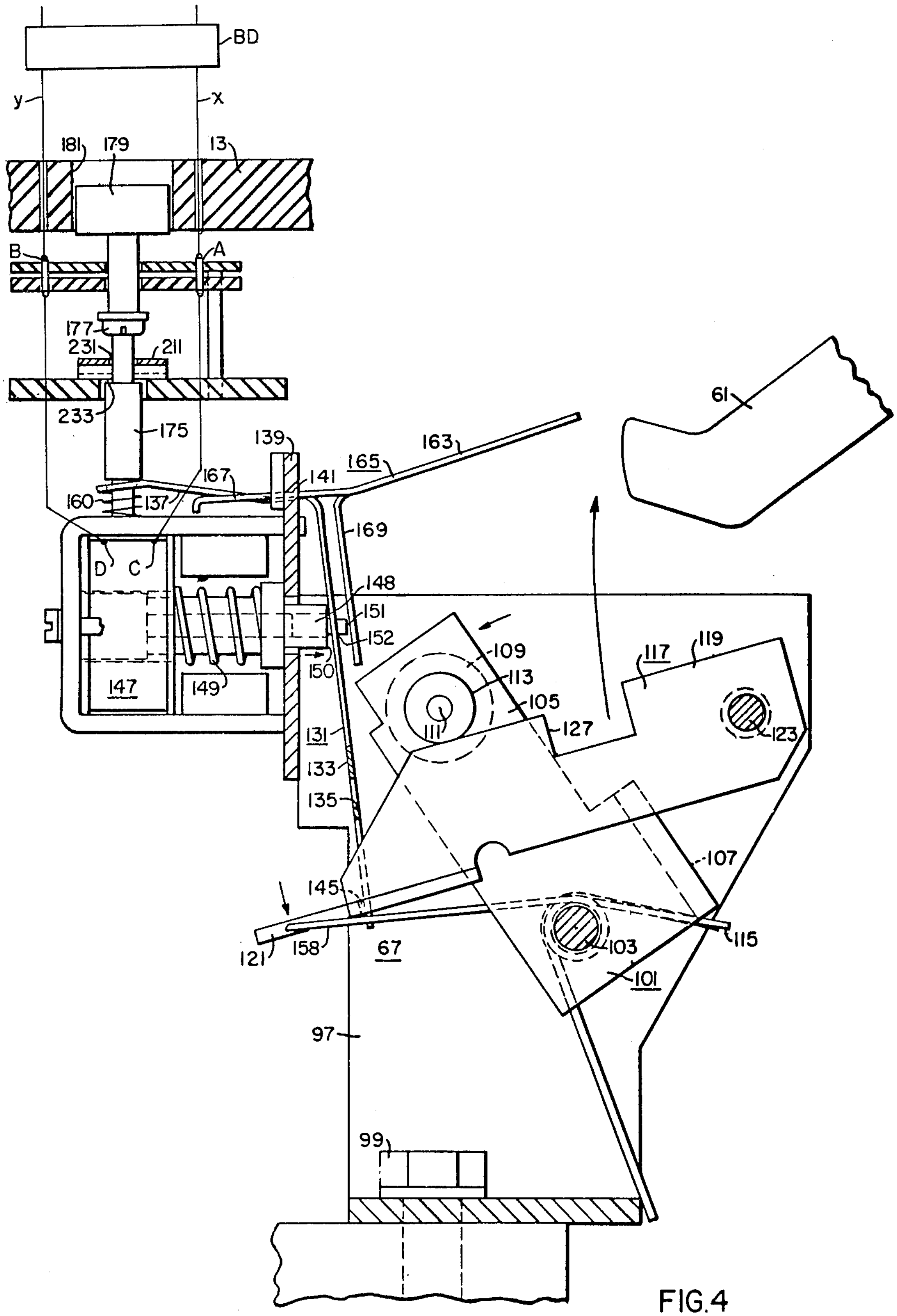
FIG. 4 is a section view of the structure shown in FIG. 3 with other parts of the breaker added and with the latch structure shown in the tripped position.

Referring to FIGS. 1 and 2–4, the latch structure 67 comprises a generally U-shaped support bracket 97 that is secured to the conductor 27 of the center pole unit and to the base 11 by means of a pair of bolts 99. A first latch member indicated generally at 101 is mounted for pivotal movement on a pivot pin 103 that is secured between the opposite side plates of the support bracket 97. As can be understood with reference to FIGS. 2–4, the first latch member 101 comprises a pair of spaced leg parts 105 and a bight part 107 connecting the spaced leg parts 105. A first roller 109 is supported between the leg parts 105 on a pin 111 that is secured to the spaced leg parts 105. A pair of second rollers 113 are also supported on the pin 111 on the outer sides of the spaced leg parts 105 (FIG. 3). A torsion spring 115 biases the first latch member 101 in a counterclockwise (FIGS. 2 and 4) direction about the pivot pin 103. The latch structure 67 also comprises a second latch member indicated generally at 117. The second latch member 117 comprises a pair of spaced leg parts 119 and an intermediate or bight part 121 that connects the opposite spaced leg parts 119 (FIGS. 3 and 4). A pair of spaced pins 123 (FIGS. 2–4) are secured to the side plates of the supporting frame 97, and the spaced legs

119 are pivotally supported on the pins 123 to support the second latch member 117 for pivotal movement on the pins 123. The opposite legs 119 of the latch member 117 are provided with notches 127 therein for receiving the rollers 113 in a manner to be hereinafter described. The latch structure 67 also comprises a third latch member, indicated generally at 131, that latches the second latch member 117 in the latched position seen in FIGS. 1–3. The third latch member 131 comprises a downwardly extending leg 133, having a window opening 135 (FIG. 4) therein, and a generally horizontal leg 137. The latch member 131 is supported on a support plate 139 for pivotal movement about an axis normal to the plane of the paper as seen in FIG. 4 and indicated generally at 141. As can be understood with reference to FIGS. 2–4, the connecting part 121 of the second latch member 117 has a small projecting part 145 (FIG. 3) that rests on a ledge in the window opening 135 (FIG. 4) to latch the second latch member in the latched position seen in FIGS. 1–3.

The latch structure 67 is automatically unlatched upon the occurrence of overload current conditions by means of a magnetic trip actuator indicated generally at 147. The magnetic trip actuator 147 is more specifically described in U.S. Pat. No. 3,783,423 issued to A. E. Maier, et al on Jan. 1, 1974. The magnetic trip actuator 147 comprises an armature plunger 148 that is maintained in the inoperative position shown in FIG. 2 by magnetic means and spring biased towards an extended or actuating position (FIG. 4) by means of a spring 149. The plunger 148 comprises a shoulder part 150 and an extension 151 that extends through an opening 152 in the latch member 131 during tripping operations. A static circuit board indicated generally at 153 (FIG. 1) is supported near the front of the breaker. The static circuit board 153 supports the components of a static trip circuit that is more specifically described in U.S. Pat. No. 3,818,275 issued to A. B. Shimp on June 18, 1974. In each pole unit, a first current transformer indicated generally at 155 (FIG. 1) is supported around the associated conductor 27. Upon the occurrence of an overload in any of the pole units, the transformer 155 senses the overload and energizes a second transformer (not shown) to operate through the static circuit 153 to pulse the magnetic trip actuator 147 to thereby release the front armature plunger 148 whereupon the spring 149 moves the armature plunger 148 from the initial position seen in FIGS. 1 and 2 to the extended actuating position seen in FIG. 4. This operation is more specifically described in the above-mentioned U.S. Pat. Nos. 3,783,423; 3,818,275 and 3,826,951.

Alternately the trip actuator 147 may be pulsed manually. If the contact arm 37 is closed, mechanical linkage LI causes switch SW to be closed. Conversely if contact arm 37 is opened switch SW is opened. Switch SW may be connected in series circuit relationship with one terminal each of a D.C. Bridge BD and a control module CM. Each of the other terminals of the Bridge BD and control module CM may be connected together. Connected as an input to the control module CM may be a source of alternating current power SO. The output lines X and Y from the D.C. Bridge BD may be fed through the housing 13 to binding posts A and B, respectively on the static circuit board 153. From the binding posts lines may be fed to the coil 147. In another embodiment of the invention the switch SW, the bridge BD, the lines X and Y and the linkage LI may all be contained within housing 13 as part of the circuit breaker apparatus or as a separate module or set of modules. In the latter case lines *u* and *v* are fed through the case 13. It is to be understood that circuit board 153 need only provide binding posts for the wires X and Y in at least one embodiment of the invention. Control module CM may have a manually operated pushbutton or similar switching means PB associated therewith. When switch SW is closed (i.e. when arm 37 is closed) and when pushbutton PB is actuated a pulse or similar form of electrical energy is provided to the coil 147 for actuation of the plunger 148 to thus cause a tripping action to take place in a manner which was described previously. The alternating current from the source SO is fed through the control module CM and the switch SW to the Bridge BD where it is converted to direct current. The direct current is provided to the coil 147 at the points C and D from the wires or leads X and Y and the terminal board 153 to cause magnetic actuation of the plunger 148. Since the coil means 147 is adapted for low energy use, a single pulse of actuating current of relatively low power, and since the bridge BD is adapted to pass direct current or convert direct current to alternating current, the manually operated trip means is in fact a low energy wide range AC or DC type device. The power source SO may be AC or DC and may range from 32V to 120V in one embodiment of the invention.

Upon movement of the armature plunger 148 to the extended actuating or tripping position seen in FIG. 4, the shoulder part 150 engages and pivots the third latch member 131 in a counterclockwise direction about the pivot 141 to effect a tripping operation of the circuit breaker in a manner to be hereinafter described.

Figure 2:
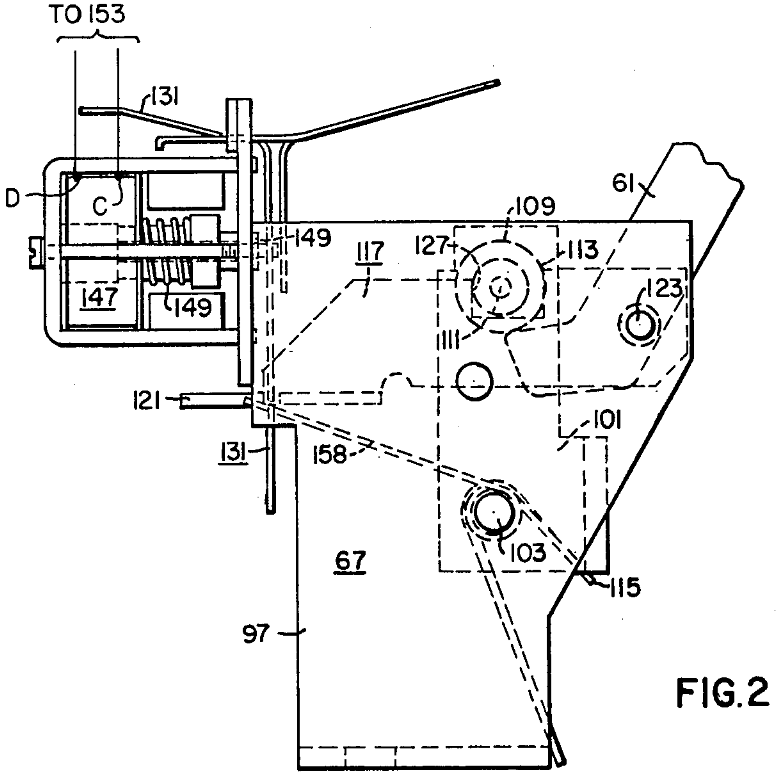
FIG. 2 is a side view with parts broken away illustrating part of the latch-and-trip means disclosed in FIG. 1.

The circuit breaker is shown in FIGS. 1–3 with the releasable member 61 in the latched position. In this position of the releasable member 71, when the circuit breaker contacts are in the closed position, the toggle 53, 57 is erected and the springs 73 are in a charged condition biasing the toggle 53, 57 toward a collapsed position. In this position, the charged springs 73 bias the upper toggle link 57 to bias the releasable member 61 in a clockwise direction about the pivot 65. This movement is prevented by the engagement of the free end of the releasable member 61 engaging the latch roller 109 and biasing the first latch member 101 in a counterclockwise direction about the pivot 103. This movement is limited by the engagement of the latch rollers 113 (FIGS. 2 and 3) with the spaced arm portions of the second latch member 117, with the rollers 113 being disposed in the slots 127 of the spaced leg portions of the second latch member 117. The force of the operating springs 73, operating through the first latch member 101 and the second latch member 117, biases the second latch member in a counterclockwise direction about the pivot 123. Counterclockwise movement of the second latch member 117 is prevented by the engagement of the latch projection 145 (FIG. 3) with the ledge in the window opening 135 (FIG. 4) of the third latch member 131 so that with the parts in the position seen in FIGS. 1–3, the stored energy operating mechanism is latched and will remain latched until the releasable member 61 is released.

Upon movement of the plunger 148 to the extended actuating or tripping position seen in FIG. 4, the circuit breaker is tripped. During this movement, the shoulder 150 of the plunger 148, operating against the third latch member 131, pivots the third latch member 131 in a counterclockwise direction about the pivot 141 whereupon the window latch 135 of the third latch member 131 releases the projection (FIG. 3) to thereby release the second latch member 117. Upon release of the second latch member 117, the springs 73 (FIG. 1) move the releasable member 61 in a clockwise direction about the pivot 65 (FIG. 1). This movement of the releasable member 61 operates through the first roller member 109 and second roller members 113 to move the first latch member 101 counterclockwise and to move the second latch member 117 counterclockwise to the unlatched tripped open position seen in FIG. 4. During this movement the releasable member 61 moves to the tripped position to effect collapse of the toggle 53, 57 to trip the circuit breaker in the manner hereinbefore described.

The circuit breaker 5 comprises a novel latch structure with substantial force reduction through a pair of latches that provide latching through two sets of roller means to enable a relatively low-force and positive trip operation.

The latch structure 67 and releasable member 61 are shown in the tripped-open position in FIG. 4. In order to reset the circuit breaker, the releasable member 61 is moved counterclockwise by movement of the handle 77 to a resetting position past the full "off" position of the handle 77 in the manner that was hereinbefore described. During this movement, the free end of the releasable member 61 engages the bight portion 107 of the first latch member 101 to pivot the first latch member 101 in a clockwise direction about the pivot 103. Near the end of this movement, the two rollers 113 drop into the notches 127 of the second latch member 117 and a torsion spring 158 moves the second latch member 117 in a clockwise direction about the pivot 123 to the latched position in FIG. 2. During this movement, the insulating shroud portion 81 (FIG. 1), of the operating handle structure 75, engages one arm 163 of a member 165. The member 165 is generally T-shaped in side view. The member 165 comprises a pair of arms 167 extending horizontally to the left (FIGS. 2 and 4), the arm 163 extending horizontally to the right and a downwardly extending leg 169. The arms 167 are pivotally supported on the plate 139 to support the member 165 for pivotal movement about an axis 141 (FIG. 4) that is generally normal to the plane of the paper as seen in FIG. 4. During resetting movement of the handle structure 75 the shroud 81 pivots the member 165 in a clockwise (FIG. 4) direction, and the downwardly extending leg 169, engaging the projecting part 151 of the plunger 148 moves the plunger 148 against the bias of the spring 151 back to the reset and relatched position seen in FIGS. 1–3. As the plunger 148 is moved back to the reset position, a spring 160 (FIG. 4) operating on the member 131, biases the member 131 in a clockwise direction about the pivot 141 to the reset position seen in FIGS. 1–3 wherein the extended projecting latch portion 145 (FIG. 3) of the second latch member 117 is again latched in the window opening 135 of the third latch member 131. As can be understood with reference to FIG. 1, when the handle structure 75 is moved to reset and relatch the breaker, the handle structure is moved close to the limit of movement in the opening 79, and upon release of the handle structure 75 following a resetting and relatching operation the springs 73 will return the handle structure 75 a short distance to the position seen in FIG. 1. When the armature plunger 148 reaches the reset position seen in FIGS. 1–3, the magnetic trip actuator will automatically reset and the armature structure 148 will be maintained in the reset position by permanent magnetic means in a manner described in the above-mentioned U.S. Pat. No. 3,783,423.

Referring to FIG. 3, it will be noted that the arm 137 of the third latch member 131 has an opening 173 therein. A pin member 175 (FIGS. 1 and 4) is provided with a lower portion that extends through the opening in the arm 137 and an upper portion that engages an adjustable screw 177 that is screwed into the lower end of a pushbutton member 179 that is positioned in an opening 181 in the insulating cover 13. The spring 160 biases the third latch member 131 in a clockwise direction to the latched position and biases the member 175 upward to thereby bias the pushbutton member 179 to the upper unactuated position seen in FIG. 1. When the circuit breaker is in the closed position and it is desired to manually trip the circuit breaker, the pushbutton 179 is pressed downwardly against the bias of the spring 160 to move the third latch member 131 in a counterclockwise direction to the tripped position to release the latched structure 67 and the releasable member 61 to thereby trip the circuit breaker in the same manner as was hereinbefore described. During the manual push-to-trip operation the armature plunger 148 remains in the initial unactuated position seen in FIGS. 1 and 2. Following a manual push-to-trip operation the circuit breaker is relatched in the same manner as was hereinbefore described by movement of the handle structure 75 to the resetting position.

It is to be understood that the switch SW and D.C. bridge BD shown in FIG. 1 may be disconnectable from the control module CM. It is also to be understood that the linkage LI may be of any convenient type sufficient to cause the switch SW to be in generally the same circuit disposition as the arm 37.

The apparatus taught herein has many advantages. One advantage is the fact that a single wide range, low energy flux shifting magnetic coil for actuating plunger 148 may be energized automatically by the current sensor 155 upon the occurrence of a fault in conductor 27 or may be energized manually by utilizing pushbutton PB.

What we claim as our invention is:

1. A circuit breaker, comprising:

(a) housing means;

(b) separable main contact means including movable arm means;

(c) tripping means disposed in said housing means for causing said movable arm means to move to an open position to cause said separable main contact means to be separated;

(d) electromagnetic coil means which is energizable to actuate said tripping means;

(e) current sensing means for sensing electric current which flows through said separable main contact means, said current sensing means providing magnetizing electrical current to a coil of said coil means when said main electric current attains a predetermined value to actuate said tripping means; and (f) manually operable electromagnetic coil energizing means connected directly to said electromagnetic coil means and bypassing said current sensing means for providing magnetizing electrical current directly to said coil means to actuate said tripping means upon command.

2. The combination as claimed in claim 1 wherein said coil means is a flux shifting means.

3. The combination as claimed in claim 2 wherein said magnetizing electrical current which is provided to said coil means from said current sensing means is provided as a pulse of electrical current.

4. The combination as claimed in claim 2 wherein said magnetizing electrical current which is provided to said coil means from said manually operable electromagnetic coil energizing means is provided as a pulse of electrical current.

5. The combination as claimed in claim 4 wherein said magnetizing electrical current which is provided to said coil means from said current sensing means is provided as a pulse of electrical current.

6. The combination as claimed in claim 1 wherein said electromagnetic coil means is operable over a wide range of voltage.

7. The combination as claimed in claim 1 wherein said electromagnetic coil means is operable on DC current.

* * * * *